2,921,839
SILICA PRECIPITATION METHOD

Hartien S. Ritter, Akron, Ohio, assignor to Columbia-Southern Chemical Corporation, Allegheny County, Pa., a corporation of Delaware No Drawing. Application December 23, 1955
Serial No. 555,194

9 Claims. (Cl. 23—182)

This invention relates to the preparation of finely divided silica particulates. More particularly, the present invention involves an improved process for the production of silica of uniform size by reacting an aqueous alkali metal silicate solution with an acid in the presence of an inert, water-immiscible liquid.

Dispersion of the aqueous alkali metal silicate solution throughout the water-immiscible liquid may be brought about by agitation, the silicate solution being present in the water-immiscible liquid in the form of droplets, as in an emulsion. Liquid or gaseous acid is added thereto and reacted with the alkali metal silicate solution droplets, thus precipitating silica granules or particulates as discrete units as opposed to the gelatinous mass commonly resulting from the reaction of an alkali metal silicate with an acid. Each droplet of silicate functions as a separate reaction "vessel," so to speak, and is independent of the other droplets. This appears to account for the fact that discrete granules precipitate and the usual gelatinous mass or agglomeration of fragmentary particles does not form.

An advantage of the process of this invention is that it is capable of producing silica in the form of granules, beads or discrete, finely-divided particles of uniform size having no ragged edges in contradistinction to "gelatinous masses" and "fragmentary particles" which have characteristically ragged edges and lack uniformity.

One of the great advantages of the instant process is the precipitation of silica granules or particulates which are not cross-linked with other particles to form a continuous network or gelatinous mass (either as a gel or as tightly-bound aggregates). This network is particularly difficult to wash free of electrolytes due to its gelatinous or integrated nature. Dried silica gels consist normally of glassy fragments, but the product of the present invention is granular silica of uniform size, generally resembling small beads which are readily washed free of electrolytes.

The present invention also substantially reduces the necessity of grinding gelatinous networks to produce finely divided materials. The disadvantage with said grinding, notwithstanding the economic disadvantage, is that the resulting fragmentary particles and fines must be screened or classified to remove particles of relatively uniform size. Obviously, such purification and sorting techniques are costly, tedious and difficult.

The silica granules prepared by the process of the present invention have many uses, among which is their use as active catalytic materials in hydrocarbon conversion reactions. The finely divided granules of the present invention, when employed in fixed bed relationship to the hydrocarbon reactants, provide a means of obtaining uniform packing throughout the catalyst bed, thus preventing pressure drops through the bed. When variations and pressure drops occur channeling results and a large portion of the catalyst bed is by-passed by the reactants, thereby decreasing the effective utilization of the catalyst within the bed.

According to the present invention a method is provided which comprises forming a dispersion of an aqueous alkali metal silicate solution and an inert, water-immiscible liquid and neutralizing the dispersion with an acid. The preferred alkali metal silicate is sodium silicate, although it is readily evident to an experienced chemist that other silicates, such as potassium silicate, may be employed. The concentration of sodium silicate can be as high as the viscosity of the precipitated slurry will permit and can range down to concentrations as low as are practical to obtain a substantial quantity of product. A sodium silicate solution comprising $Na_2O(SiO_2)_x$, where $x$ is a value between 1 and 5 (normally not less than 2), and water is generally used, said solution containing between about 10 and 150 grams of $SiO_2$ (as alkali metal silicate) per liter, preferably between 30 and 80 grams $SiO_2$ per liter. $Na_2O(SiO_2)_x$, where $x$ is about 3.3, is preferred.

Any water-immiscible liquid can be used which does not react with the alkaline earth metal silicate. The volume proportion of non-aqueous liquid to silicate solution preferred is usually about 1:1, but, of course, this proportion may be varied in either direction so long as enough water and non-aqueous liquid are present to establish a pair of immiscible liquid phases and thus form a suitable dispersion. Normally the volume ratio of non-aqueous phase to aqueous phase ranges from 0.1 to 1 on the one hand to 10 to 1 on the other. Either oil-in-water or water-in-oil dispersions give the desired granular product.

Among the many substantially inert, water-immiscible liquids suitable for the present invention are carbon tetrachloride, perchloroethylene, chloroform, diethyl ether, diamyl ether, amyl bromide, cyclohexyl chloride, n-butyl alcohol, kerosene, octane, hexane, heptane, benzene, toluene, orthodichlorobenzene, and the like. Mixtures thereof may also be employed.

Any desired acid-reacting substance capable of precipitating silica from the silicate solution may be used to neutralize the silicate solution, said acid-reacting substance being either gaseous or liquid. Among the preferred acids are hydrochloric acid, carbon dioxide, sulfur dioxide, or the like, in varying concentrations. Other acids or acid-reacting substances include oxalic acid, formic acid, alum, ammonium chloride, ammonium sulfate, sodium carbonate or other water-soluble organic or inorganic acid-reacting materials, such as mineral acids, etc.

The rate of neutralization of the sodium silicate is a matter of choice. So long as a fairly rapid neutralization is used, gel granules can be obtained. As will be seen hereinafter, particularly good results are obtained using a 5 percent by weight hydrochloric acid solution and reducing the pH of the suspension to a pH of from about 2 to 9 in 15 to 30 minutes, although greater or less time may be employed depending upon the degree of agitation and dispersion.

The temperature at which the present reaction is brought about may vary considerably since any temperature above freezing could be used with a normal increase in silica particle size with increasing temperature. Exceedingly good results are obtained when operating at room temperature, i.e., about 22° C., plus or minus 5° C.

The degree of agitation generally required for the process of the present invention is dependent upon several factors. The difference in density between the two phases plays an important role since the greater this difference the more agitation is required to procure a uniform dispersion. Also, the size of the silica granules produced can be regulated by agitation since the size of the droplets in dispersion becomes smaller as the agitation is increased so that, as a result, the size of the resulting granules is smaller also. Although vigorous agitation is generally preferred it is sufficient to agitate to a degree such that a dispersion of one phase in the other is maintained.

Another feature of the present invention comprises the use of emulsifying agents. A finer dispersion can be obtained with less vigorous agitation if an emulsifying agent is present. If an oil-soluble emulsifying agent is used, a water-in-oil type of dispersion is more likely to result while a water-soluble emulsifying agent produces an oil-in-water type dispersion as a rule. Emulsifiers which may be used are soap (e.g., sodium oleate or like material), tetraethylene pentamine, gelatin, and the like.

Still another feature of the present invention comprises the addition of NaCl or other alkali metal salts, particularly salts of strong acids, to the silica precipitation system. Salt favors pigment precipitation. The product from dispersion precipitation of silica can be varied from a gel granule to a coarse pigment by variation of the amount of salt added.

Normally the amount of acid added is at least enough to cause substantially complete precipitation of the silica. The pH of the dispersion system need only be dropped to 10 to 11 to precipitate silica but is preferably taken at least to neutrality for two reasons. First, the precipitated silica is relatively free of $Na^+$ and other cations after washing and, secondly, the effectiveness of emulsifying agents (such as soaps), when used, is reduced at neutral or acid pH so that separation of the two phases is facilitated. The final pH can be varied in the range from 2 to 9, however, without variation in the appearance of the granules of silica obtained. Even larger amounts of acid can be added if desired.

The separation of the two phases of liquid upon cessation of agitation is good enough that over 90 percent of the non-aqueous liquid can be separated by decanting after the silica is precipitated. Depending on the relative densities of the solutions, the water-immiscible liquid phase constitutes the upper or lower phase. Distillation after decanting is preferable to remove the residual non-aqueous liquid from the silica slurry since recovery is then almost 100 percent. Also, the silica granules sometimes are hollow and contain the non-aqueous phase and distillation is the most convenient way to remove the entrapped liquid. A distillation step can be carried out either before or after washing the silica, although before washing is more convenient. Furthermore, distillation gives the silica granules a heat treatment which is beneficial in preventing agglomeration, particle growth or other physical or chemical changes which may occur in a precipitated silica not so stabilized.

It is sometimes advantageous to azeotropically distill with the non-aqueous liquid returned to the silica slurry since a water-free slurry which can be easily filtered and dried results.

Drying is best carried out slowly with mechanical mixing or crumbling of the cake, since if the washed filter cake is dried directly at an elevated temperature without the benefit of said mixing or crumbling, the granules may become cemented together by the evaporation of water, leaving a deposit of silica. Hence, by slow drying with mechanical mixing the granules are easily dried without aggregating and a free-flowing granular product is obtained. The same effect can be obtained by re- moving water from the slurry with a water-miscible solvent such as acetone or alcohol.

It can be seen from the foregoing that a wide variety of reaction concentrations and conditions may be employed in the process of the present invention. It may also be seen that the skilled chemist can operate within this wide scope of conditions and control his final products. The instant process is not limited to silica but can be used to prepare alumina-silica compositions, silica-stannic oxide, silica-ceria, silica-thoria, silica-alumina-ceria, or the like, such as are used in the catalyst field. For example, alumina-silica compositions can be realized by the addition of alum or other aluminum salt to the silica solution.

Among the advantages inherent in the present invention is the fact that the reaction conditions may be so governed as to produce a wide variety of finely divided granules having sizes ranging from about 1 millimeter or more to smaller than 0.01 millimeter, usually 0.5 millimeter to 0.01 millimeter. In addition, the particle size is uniform and the silica is not interspersed with glassy fragments of highly irregular shapes which, when ground, result in smaller, irregular fragments containing a substantial amount of fines. These features provide means whereby granules may be prepared which have uses as desiccants, gas absorbers, catalysts or catalyst carriers.

Although it is not intended that the scope of the present invention be limited thereby, the following examples particularly point out specific embodiments of the present invention whereby discrete silica granules hereinabove described may be produced.

EXAMPLE I

Into a three-necked five-liter flask fitted with a propeller-type agitator and an inlet for adding acid were introduced one (1) liter of kerosene and one (1) liter of an aqueous sodium silicate solution containing approximately 48 grams of $SiO_2$ per liter, the sodium silicate having the formula $Na_2O(SiO_2)_{3.3}$. Enough 5 percent by weight hydrochloric acid solution was added to the flask, while the contents thereof were being agitated (the agitation rate being maintained at a fairly constant speed of about 400 revolutions per minute) and a dispersion maintained, to realize a pH of 6 in fifteen (15) minutes. Agitation was then stopped and the product allowed to stand for a short time, after which the non-aqueous phase was decanted and the remaining precipitate was filtered, washed and dried at about 110° C. The dry product was in the form of finely-divided granular beads having a diameter of 0.1 to 0.5 millimeter.

EXAMPLE II

Into a five-gallon bottle fitted with a Lightnin mixer seven (7) liters of an aqueous sodium silicate solution containing approximately 48 grams $SiO_2$ per liter, the sodium silicate having the formula $Na_2O(SiO_2)_{3.3}$, and seven (7) liters of perchloroethylene were poured. A hydrochloric acid solution containing 5 percent by weight HCl was added to the bottle while agitating (the agitation rate being maintained at about 1500 revolutions per minute) the contents and maintaining a dispersion thereof. Neutralization was continued until a pH of 6 resulted, the total time required being 20 minutes. Agitation was then ceased and the product treated as in Example I.

Other examples appear in the following tables. In Table I the proportion of water-immiscible liquid to sodium silicate $Na_2O(SiO_2)_{3.3}$ in the reaction vessel is one liter to one liter, as in Example I; in Table II the proportion is 7 liters to 7 liters, as in Example II. In every case the sodium silicate solution contains approximately 48 grams $SiO_2$ per liter and the HCl solution employed has a 5 percent by weight concentration.

Table I

| Water-Immiscible Liquid | Emulsifier | NaCl | Time Required to Reach Final pH | Final pH |
|---|---|---|---|---|
| Kerosene | None | None | 15 Min | 6 |
| Do | do | do | 4 Hrs | 6 |
| Do | do | 50 g | 3 Hrs | 6 |
| Do | Tetraethylene pentamine (2 grams) | None | 20 Min | 6 |
| Do | Liquid soap (10 milliliters) | do | 20 Min | 6 |
| Perchloroethylene | do | do | 20 Min | 6 |
| Do | None | do | 10 Min | 2 |
| Do | do | do | 20 Min | 6 |
| Do | do | do | 15 Min | 6 |
| Kerosene-perchloroethylene | do | do | 30 Min | 6 |
| Do | Gelatin (0.5 percent by weight) | do | 30 Min | 6 |
| Do | None | do | 30 Min | 6 |
| n-butyl alcohol | do | do | 30 Min | 6 |
| Do | do | do | 5 Min | 6 |
| Do | do | do | 20 Min | 5 |
| Do | do | do | 10 Min | 5 |

Table II

| Water-Immiscible Liquid | Emulsifier | NaCl | Time Required to Reach Final pH | Final pH |
|---|---|---|---|---|
| Perchloroethylene | None | None | 20 Min | 4 |
| Do | do | do | 20 Min | 6 |
| Do | do | do | 20 Min | 5 |
| Do | do | do | 20 Min | 8 |
| Do | Liquid soap (40 milliliters) | do | 20 Min | 8 |

The above tables demonstrate various methods whereby the finely-divided silica granules of the present invention may be realized.

Although the present invention has been described with reference to specific details of certain embodiments, it is not intended that said embodiments shall be regarded as limitations upon the scope of the invention except insofar as included in the following claims.

I claim:
1. A method of producing finely divided granular silica of substantially uniform particle size which comprises, adding an aqueous alkali metal silicate solution to a neutral water-immiscible liquid, agitating the mixture of silicate solution and water-immiscible liquid to disperse said silicate solution in droplets of substantially uniform particle size uniformly throughout said liquid; and thereafter, while continuing said agitation, introducing a water-soluble acid capable of precipitating silica from said silicate solution into said agitated dispersion to provide for a reaction between said acid and said aqueous alkali metal silicate droplets at the interface between said droplets and said water-immiscible liquid, discontinuing said agitation, separating said water-immiscible liquid and recovering said granular particles of silica formed by said reaction.

2. The method of claim 1 wherein said aqueous alkali metal silicate solution has an $SiO_2$ concentration of 10 to 150 grams per liter and said silicate has the formula $Na_2O(SiO_2)_x$ where $x$ has a value between 1 and 5.

3. The method of claim 1 wherein the alkali metal silicate is sodium silicate.

4. The method of claim 1 wherein the inert, water-immiscible liquid is perchloroethylene.

5. The method of claim 1 wherein the acid is hydrochloric acid.

6. The method of claim 1 wherein the size of the particles is controlled by the intensity of the agitation.

7. The method of claim 1 wherein the water immiscible liquid is butanol.

8. The method of claim 1 wherein alkali metal salt is present in the medium in which the silica is formed.

9. The method of claim 1 wherein sodium chloride is present in the medium in which the silica is formed.

References Cited in the file of this patent

UNITED STATES PATENTS

| | | |
|---|---|---|
| 2,384,942 | Marisic | Sept. 18, 1945 |
| 2,506,316 | Pierce | May 2, 1950 |
| 2,641,583 | Gring | June 9, 1953 |
| 2,672,452 | Wankat | Mar. 16, 1954 |